United States Patent
Kim et al.

(10) Patent No.: US 11,878,931 B2
(45) Date of Patent: Jan. 23, 2024

(54) LOAD CARRIER AND WINDOW MANUFACTURING SYSTEM HAVING THE SAME

(71) Applicant: Samsung Display Co., Ltd., Yongin-si (KR)

(72) Inventors: Hyo-Seop Kim, Asan-si (KR); Hyoungsuk Roh, Cheonan-si (KR); Yong-Kyun Sim, Yongin-si (KR); Min-Woo Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 155 days.

(21) Appl. No.: 17/380,511

(22) Filed: Jul. 20, 2021

(65) Prior Publication Data
US 2022/0135464 A1  May 5, 2022

(30) Foreign Application Priority Data
Nov. 2, 2020 (KR) .......................... 10-2020-0144651

(51) Int. Cl.
C03B 40/00 (2006.01)
B65G 49/06 (2006.01)

(52) U.S. Cl.
CPC ............ *C03B 40/00* (2013.01); *B65G 49/062* (2013.01); *B65G 49/066* (2013.01)

(58) Field of Classification Search
CPC .. B65G 49/062; B65G 49/066; B65G 49/063; B65G 49/06; B65G 49/061; C03B 40/00; B60P 3/002
See application file for complete search history.

(56) References Cited

U.S. PATENT DOCUMENTS

| | | | | |
|---|---|---|---|---|
| 1,066,371 | A * | 7/1913 | Bosworth | A47F 5/0892 211/117 |
| 6,183,184 | B1 * | 2/2001 | Shiwaku | B65G 1/0464 414/626 |
| 7,780,020 | B2 * | 8/2010 | Yoshitaka | H01L 21/67733 414/940 |
| 8,382,417 | B2 * | 2/2013 | Yoshida | H01L 21/67733 414/626 |
| 9,224,628 | B2 * | 12/2015 | Bufano | H01L 21/6773 |
| 9,881,824 | B2 * | 1/2018 | Ito | H01L 21/67733 |
| 2003/0185656 | A1 * | 10/2003 | Hansl | B65G 1/0435 414/277 |
| 2004/0109746 | A1 * | 6/2004 | Suzuki | H01L 21/67733 414/373 |
| 2004/0216957 | A1 * | 11/2004 | Hansl | B66F 9/07 187/289 |

(Continued)

FOREIGN PATENT DOCUMENTS

| KR | 10-1141406 | 5/2012 |
|---|---|---|
| KR | 10-2013-0022936 | 3/2013 |
| KR | 10-1428656 | 8/2014 |

*Primary Examiner* — Devin K Barnett
(74) *Attorney, Agent, or Firm* — KILE PARK REED & HOUTTEMAN PLLC

(57) ABSTRACT

A window manufacturing system includes a first wire, a second wire spaced apart from the first wire, a controller moving the first wire up and down and the second wire up and down, and a load carrier connected to the first wire and the second wire. Window substrates are disposed on the load carrier. The controller moves the first wire and the second wire in opposite directions to each other.

15 Claims, 12 Drawing Sheets

(56) References Cited

U.S. PATENT DOCUMENTS

| | | | | |
|---|---|---|---|---|
| 2005/0008467 A1* | 1/2005 | Huang | ............... | H01L 21/67775 |
| | | | | 414/626 |
| 2006/0051188 A1* | 3/2006 | Hoshino | ........... | H01L 21/67733 |
| | | | | 414/277 |
| 2006/0051192 A1* | 3/2006 | Fujiki | .................... | B65G 37/02 |
| | | | | 414/626 |
| 2006/0182553 A1* | 8/2006 | Yamamoto | .............. | B65G 47/61 |
| | | | | 414/278 |
| 2007/0140817 A1* | 6/2007 | Hansl | ........................ | B66F 9/07 |
| | | | | 414/277 |
| 2009/0127864 A1* | 5/2009 | Alvite | ...................... | F03B 17/04 |
| | | | | 74/DIG. 9 |
| 2012/0183377 A1* | 7/2012 | Toguri | ....................... | B66B 1/44 |
| | | | | 414/281 |
| 2015/0197400 A1* | 7/2015 | Kinugawa | ............. | H01L 21/6773 |
| | | | | 414/458 |
| 2016/0059871 A1* | 3/2016 | Koumoto | ................. | B61L 23/34 |
| | | | | 104/130.01 |
| 2016/0060861 A1* | 3/2016 | Darden | ...................... | E04B 1/40 |
| | | | | 52/741.1 |
| 2016/0138857 A1* | 5/2016 | Klingshirn | ............... | F25D 29/00 |
| | | | | 62/130 |
| 2017/0007864 A1* | 1/2017 | Magnone | ............... | A62C 37/40 |
| 2018/0297779 A1* | 10/2018 | Masuda | .................... | B66F 9/07 |
| 2019/0041637 A1* | 2/2019 | German | ................ | G06T 19/006 |
| 2021/0053772 A1* | 2/2021 | English | ..................... | B66F 9/18 |
| 2022/0380125 A1* | 12/2022 | Wada | ................... | B65G 49/061 |

* cited by examiner

LOAD CARRIER AND WINDOW MANUFACTURING SYSTEM HAVING THE SAME

CROSS-REFERENCE TO RELATED APPLICATION(S)

This application claims priority to and benefits of Korean Patent Application No. 10-2020-0144651 under 35 U.S.C. § 119, filed on Nov. 2, 2020 in the Korean Intellectual Property Office, the entire contents of which are incorporated herein by reference.

BACKGROUND

1. Technical Field

The disclosure relates to a load carrier and a window manufacturing system including the load carrier.

2. Description of the Related Art

Electronic devices that provide images to a user, such as a smartphone, a digital camera, a notebook computer, a navigation unit, and a smart television, include a display device to display the images. The display device generates the images and provides the images to the user through a display screen thereof.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a load carrier capable of preventing a window from being deformed.

The disclosure provides a window manufacturing system including the load carrier.

Embodiments provide a window manufacturing system which may include a first wire, a second wire spaced apart from the first wire, a controller moving the first wire and the second wire up and down, and a load carrier connected to the first wire and the second wire. Windows substrates may be disposed in the load carrier. The controller may move the first wire and the second wire in opposite directions to each other.

In the embodiments, the load carrier may include sidewalls, a bottom portion connected to a lower end of the sidewalls. The window substrates may be disposed between the sidewalls.

In the embodiments, the sidewalls may include a first sidewall portion connected to an end of the bottom portion, and a second sidewall portion connected to another end of the bottom portion. The first wire may be connected to the first sidewall portion. The second wire may be connected to the second sidewall portion.

In the embodiments, an upper end of the first side wall portion may be lower than an upper end of the second sidewall portion when the controller moves the first wire in a downward direction and moves the second wire in an upward direction. The upper end of the first sidewall portion may be higher than the upper end of the second sidewall portion when the controller moves the first wire in the upward direction and moves the second wire in the downward direction.

In the embodiments, the upper end of first sidewall portion may be lower than the upper end of the second sidewall portion in a first operation. The upper end of the first sidewall portion may be higher than the upper end of the second sidewall portion in a second operation. The first operation and the second operation may be repeated every about one second to about five seconds.

In the embodiments, each of the sidewalls may include a first surface and a second surface. The first surface of a sidewall may face the second surface of another sidewall. The load carrier may include protrusions disposed on the first surface and the second surface of the sidewalls.

In the embodiments, the protrusions may include first protrusions disposed on the first of a sidewall and second protrusions disposed on the second surface of another sidewall.

In the embodiments, the first protrusions may face the second protrusions, respectively.

In the embodiments, the first protrusions may have a same area an area of the second protrusions.

In the embodiments, the first protrusions may have a different area from an area of the second protrusions.

In the embodiments, the first protrusions and the second protrusions may be arranged in a matrix form.

In the embodiments, the first protrusions may be alternately arranged with the second protrusions.

In the embodiments, the first protrusions may extend in one direction.

In the embodiments, the first protrusions may include first sub-protrusions and second sub-protrusions that may retract into the sidewalls, or may protrude out from the sidewalls.

In the embodiments, the second sub-protrusions may protrude out from the sidewalls when the first sub-protrusions retract into the sidewalls, and the second sub-protrusions retract into sidewalls when the first sub-protrusions protrude out from the sidewalls.

In the embodiments, a load carrier may include sidewalls arranged in a first direction, a bottom portion connected to a lower end of the sidewalls, a first wire connected to a first sidewall portion disposed at a leftmost position among the sidewalls in the first direction, a second wire connected to a second sidewall portion disposed at a rightmost position among the sidewalls in the first direction, and protrusions. Each sidewall may include a first surface and a second surface, the first surface of a sidewall facing the second surface of another sidewall. The protrusions may be disposed on the first surface and the second surface of the sidewalls.

In the embodiments, the protrusions may include first protrusions disposed on the first surface of the sidewalls and second protrusions disposed on the second surface of the sidewalls.

In the embodiments, the first protrusions may include first sub-protrusions and second sub-protrusions that may retract into the sidewalls or may protrude from the sidewalls.

In the embodiments, the first wire and the second wire may move up and down. The first wire and the second wire may move in opposite directions to each other.

According to the above, a contact area and a contact time between the window substrates and the load carrier into which the window substrates are loaded are decreased while a chemical reinforcement process with respect to the window substrates are performed using an ion exchange method. When the contact area and the contact time between the window substrate and the load carrier are reduced, a deformation of a surface of the window substrates may be prevented.

BRIEF DESCRIPTION OF THE DRAWINGS

The above and other aspects and features of the disclosure will become readily apparent by describing in detail embodiments thereof with reference to the following drawings wherein.

DETAILED DESCRIPTION OF THE EMBODIMENTS

Figure 1:
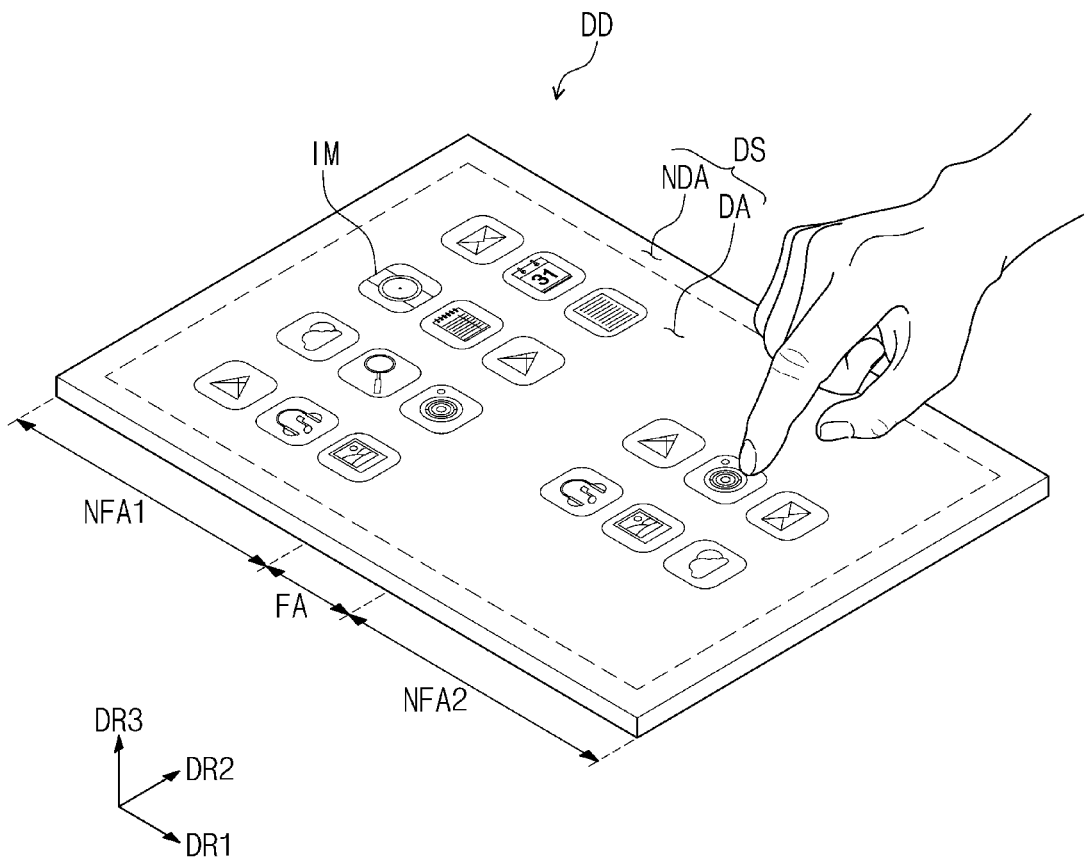
FIG. 1 is a schematic perspective view showing a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the disclosure, it will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the embodiments will be explained in detail with reference to the accompanying drawings.

FIG. 1 is a schematic perspective view showing a display device DD according to an embodiment of the disclosure.

Referring to FIG. 1, the display device DD according to the embodiment of the disclosure may have a rectangular shape defined by long sides extending in a first direction DR1 and short sides extending in a second direction DR2 crossing the first direction DR1. However, the shape of the display device DD should not be limited to the rectangular shape, and the display device DD may have other shapes, such as a circular shape and a polygonal shape. The display device DD may be a flexible display device.

Hereinafter, a direction substantially perpendicular to a surface defined by the first direction DR1 and the second direction DR2 may be referred to as a "third direction DR3". In the disclosure, the expression "when viewed in a plane" may mean being viewed in the third direction DR3.

The display device DD may include a folding area FA and non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The second non-folding area NFA2, the folding area FA, and the first non-folding area NFA1 may be arranged in the first direction DR1.

In the embodiment, one folding area FA and two non-folding areas NFA1 and NFA2 are shown as an example, however, the number of the folding areas FA and the number of non-folding areas NFA1 and NFA2 should not be limited thereto. For example, the display device DD may include more than two non-folding areas and folding areas disposed between the non-folding areas.

An upper surface of the display device DD may be referred to as a "display surface DS" and may be a plane defined by the first direction DR1 and the second direction DR2. Images IM generated by the display device DD may be provided to a user through the display surface DS.

The display surface DS may include a display area DA and a non-display area NDA around the display area DA.

The display area DA displays the image, and the non-display area NDA does not display the image. The non-display area NDA surrounds the display area DA and defines an edge of the display device DD, which is printed with a color.

Figure 2:
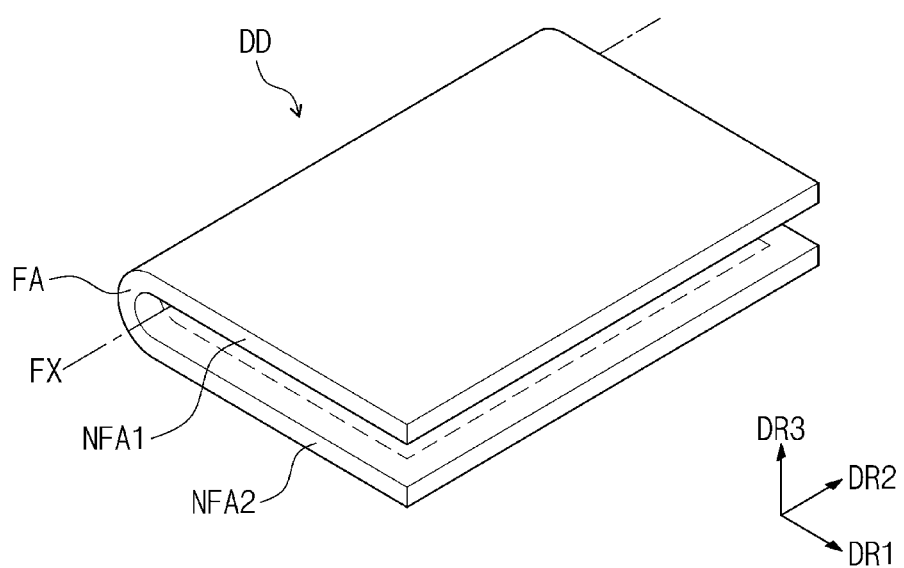
FIG. 2 is a schematic perspective view showing a folded state of the display device shown in FIG. 1.

FIG. 2 is a schematic perspective view showing a folded state of the display device DD shown in FIG. 1.

Referring to FIG. 2, the display device DD may be, but not limited to, a foldable display device DD that is folded or unfolded. For example, the folding area FA may be folded about a folding axis FX substantially parallel to the second direction DR2, and thus, the display device DD may be folded. The folding axis FX may be defined as a minor axis substantially parallel to the short sides of the display device DD.

When the display device DD is folded, the first non-folding area NFA1 and the second non-folding area NFA2 face each other, and thus, the display device DD may be inwardly folded (in-folding) such that the display surface DS is not exposed to the outside.

Figure 3:
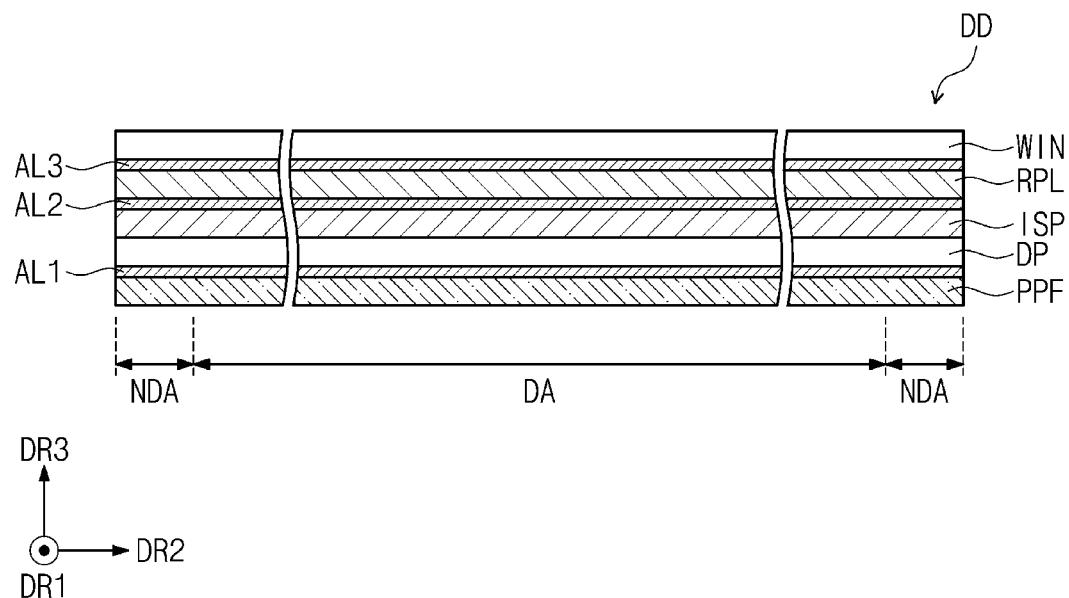
FIG. 3 is a schematic cross-sectional view showing the display device shown in FIG. 1.

FIG. 3 is a schematic cross-sectional view showing the display device DD shown in FIG. 1.

As an example, FIG. 3 shows a schematic cross-section of the display device DD when viewed in the first direction DR1.

Referring to FIG. 3, the display device DD may include a display panel DP, an input sensing portion ISP, an anti-reflective layer RPL, a window WIN, a panel protective film PPF, and first, second, and third adhesive layers AL1, AL2, and AL3.

The display panel DP may be a flexible display panel. The display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as an example of the display panel DP.

The input sensing portion ISP may be disposed on the display panel DP. The input sensing portion ISP may include sensors (not shown) to sense an external input by a capacitive method. The input sensing portion ISP may be manufactured directly on the display panel DP when the display device is manufactured. However, it should not be limited thereto, and the input sensing portion ISP may be attached to the display panel DP by an adhesive layer after being manufactured separately from the display panel DP.

The anti-reflective layer RPL may be disposed on the input sensing portion ISP. The anti-reflective layer RPL may reduce a reflectance of an external light incident to the display panel DP from the above of the display device DD. As an example, the anti-reflective layer RPL may include a retarder and/or a polarizer.

The window WIN may be disposed on the anti-reflective layer RPL. The window WIN may protect the display panel DP, the input sensing portion ISP, and the anti-reflective layer RPL from external scratches and impacts.

The panel protective film PPF may be disposed under the display panel DP. The panel protective film PPF may protect a lower portion of the display panel DP. The panel protective film PPF may include a flexible plastic material such as polyethylene terephthalate (PET).

The first adhesive layer AL1 may be disposed between the display panel DP and the panel protective film PPF. The display panel DP and the panel protective film PPF may be coupled to each other by the first adhesive layer AL1.

The second adhesive layer AL2 may be disposed between the anti-reflective layer RPL and the input sensing portion ISP. The anti-reflective layer RPL and the input sensing portion ISP may be coupled to each other by the second adhesive layer AL2.

The third adhesive layer AL3 may be disposed between the window WIN and the anti-reflective layer RPL. The window WIN and the anti-reflective layer RPL may be coupled to each other by the third adhesive layer AL3.

Figure 4:
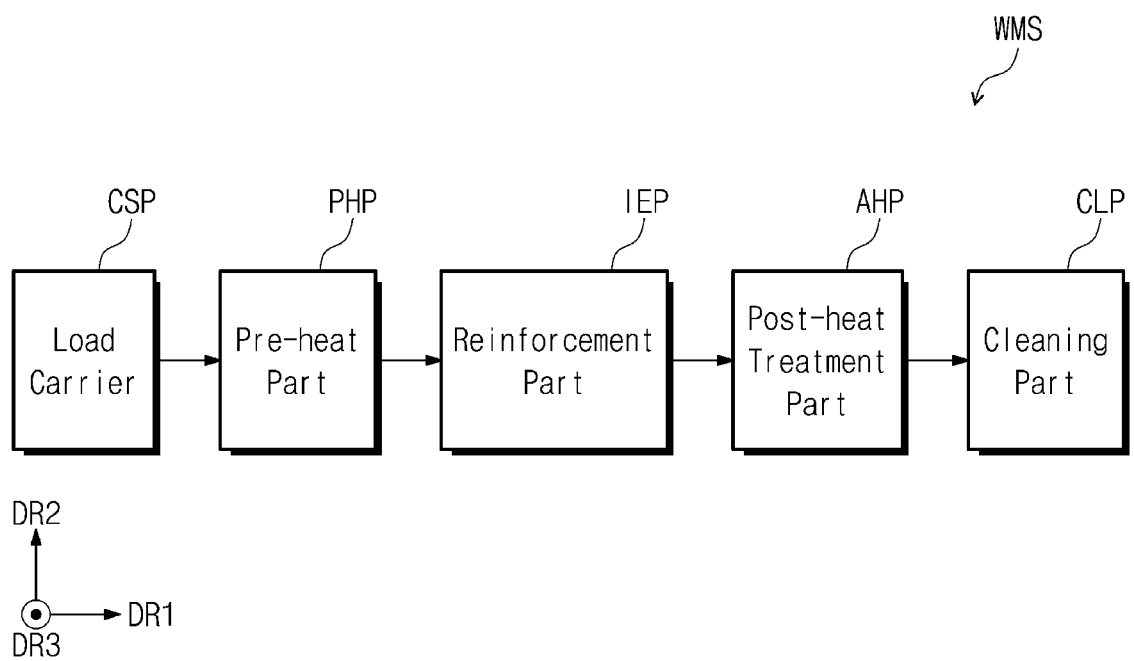
FIG. 4 is a block diagram showing a window manufacturing system.

FIG. 4 is a block diagram showing a window manufacturing system WMS.

Referring to FIG. 4, the window manufacturing system WMS may include a load carrier CSP, a pre-heat part PHP, a reinforcement part IEP, a post-heat treatment part AHP, and a cleaning part CLP.

The load carrier CSP, the pre-heat part PHP, the reinforcement part IEP, the post-heat treatment part AHP, and the cleaning part CLP may be sequentially arranged in the first direction DR1.

Although not shown in figures, window substrates may be loaded into the load carrier CSP and may be reinforced while sequentially passing through the pre-heat part PHP, the reinforcement part IEP, the post-heat treatment part AHP, and the cleaning part CLP.

The window substrates may be loaded into the load carrier CSP. The window substrates loaded into the load carrier CSP will be described in detail with reference to FIG. 5.

In the pre-heat part PHP, a process of raising a temperature of the window substrates to a certain temperature at a constant rate may be carried out. The window substrates may be sufficiently preheated not to be suddenly exposed to a high temperature environment of the reinforcement part IEP.

In the reinforcement part IEP, a process of heat-treating the window substrates by a chemical reinforcing method may be carried out. The window substrates may be sunk in a potassium nitrate solution of the reinforcement part IEP. Sodium ions on a surface of the window substrates and potassium ions in the potassium nitrate solution may be exchanged with each other in the reinforcement part IEP maintained in a high temperature state to form a stress layer on the surface of the window substrates. The window substrates each on which the stress layer is formed may have an enhanced surface density. As an example, the high temperature state of the reinforcement part IEP may be within a range from about 400° C. to about 500° C.

In the post-heat treatment part AHP, a process of heat-treating the window substrates that is reinforced in the reinforcement part IEP may be carried out. The heat-treated window substrates may have improved surface quality since fine concave and convex portions on the surface of the window substrates are removed. However, the surface quality of the window substrates may be degraded in the heat-treating process carried out in the post-heat treatment part AHP due to the difference between contact portions and non-contact portions of the window substrates and the load carrier CSP. As an area of the contact portion between the window substrates and the load carrier CSP increases, the surface quality of the window substrates may be degraded. As the area of contact between the window substrates and the load carrier CSP decreases, and the time the window substrates contact the load carrier CSP decreases, the surface quality of the window substrates may be improved.

In the cleaning part CLP, a process of cleaning the window substrates may be carried out. In the cleaning part CLP, an ultrasonic cleaning method that generates high-frequency ultrasonic waves in a cleaning solution in which the window substrates are sunk and cleans the window substrates by a vibration of water molecules, a spraying method that sprays a cleaning solution to the window substrates, or a dipping method that sinks the window substrates in a cleaning solution may be carried out.

Figure 5:
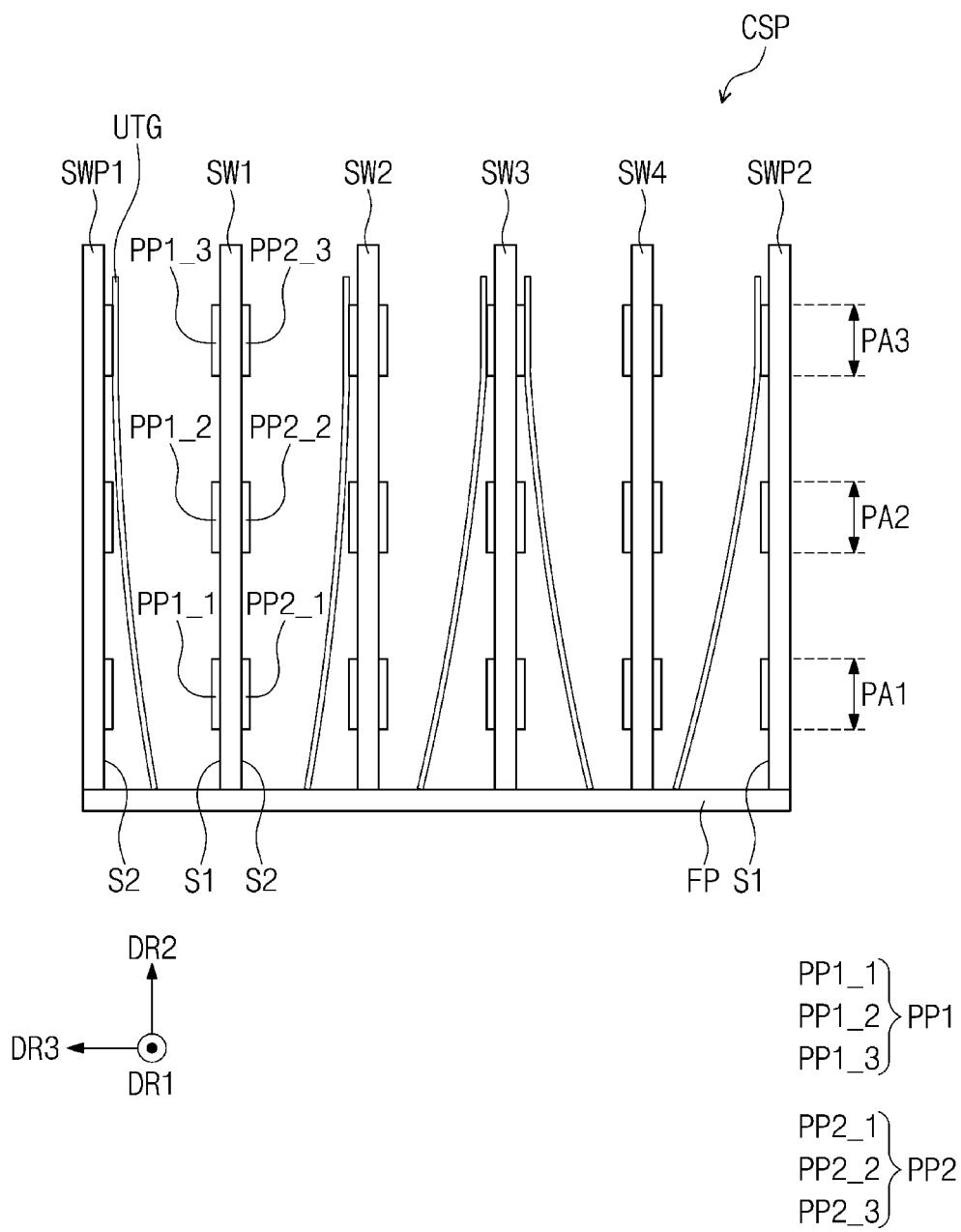
FIG. 5 is a schematic side view showing a load carrier into which window substrates are loaded.

FIG. 5 is a schematic side view showing the load carrier CSP into which the window substrates are loaded.

Referring to FIG. 5, the load carrier CSP may include a bottom portion FP, sidewalls SWP1, SWP2, SW1, SW2, SW3, and SW4, first protrusions PP1_1, PP1_2, and PP1_3, and second protrusions PP2_1, PP2_2, and PP2_3.

The sidewalls SWP1, SWP2, SW1, SW2, SW3, and SW4 may include a first sidewall portion SWP1, a second sidewall portion SWP2, and third sidewall portions SW1, SW2, SW3, and SW4 disposed between the first sidewall portion SWP1 and the second sidewall portion SWP2. As an example, six sidewalls are shown, however, the number of the sidewalls may not be limited to six in the embodiments.

The first sidewall portion SWP1 may be defined as a sidewall disposed at a leftmost position among the sidewalls SWP1, SWP2, SW1, SW2, SW3, and SW4. The second sidewall portion SWP2 may be defined as a sidewall disposed at a rightmost position among the sidewalls SWP1, SWP2, SW1, SW2, SW3, and SW4. The third sidewall portions SW1, SW2, SW3, and SW4 may include a first sidewall SW1, a second sidewall SW2, a third sidewall SW3, and a fourth sidewall SW4. The load carrier CSP may include protruding areas PA1, PA2, and PA3 defined therein. The protruding areas PA1, PA2, and PA3 may include a first protruding area PA1, a second protruding area PA2, and a third protruding area PA3. The first protruding area PA1, the second protruding area PA2, and the third protruding area PA3 may be arranged in the second direction DR2 and may be spaced apart from each other at regular intervals. The first, second, and third protruding areas PA1, PA2, and PA3 may be sequentially defined from bottom to top.

In this example, three protruding areas PA1, PA2, and PA3 are shown, however, the number of the protruding areas in the embodiments are not be limited to three. The first, second, and third protruding areas PA1, PA2, and PA3 may be defined in the sidewalls SWP1, SWP2, SW1, SW2, SW3, and SW4.

The bottom portion FP may have a square bar structure extending in the third direction DR3. However, the bottom portion FP of the embodiments are not be limited to the square bar structure, and the bottom portion FP may have other structures. For example, the bottom portion FP may have a round bar structure extending in the third direction DR3, or the bottom portion FP may have a round bar structure provided with grooves into which the window substrates are inserted.

The bottom portion FP may be attached to the sidewalls. Although not shown in figures, multiple bottom portion FP may be provided, and the bottom portions FP may extend in the third direction DR3 and may be arranged in the first direction DR1.

The sidewalls SWP1, SWP2, SW1, SW2, SW3, and SW4 may have a rectangular shape defined by long sides extending in the first direction DR1 and short sides extending in the second direction DR2, however, the embodiments are not be limited thereto. The sidewalls SWP1, SWP2, SW1, SW2, SW3, and SW4 may have various shapes. The sidewalls SWP1, SWP2, SW1, SW2, SW3, and SW4 may be disposed to be perpendicular to the direction of the bottom portion FP. The sidewalls SWP1, SWP2, SW1, SW2, SW3, and SW4 may be arranged in the third direction DR3 and may be spaced apart from each other at regular intervals. In this example, six sidewalls are shown, however, the number of the sidewalls should not be limited to six.

The first sidewall portion SWP1 disposed at the leftmost position among the sidewalls SWP1, SWP2, SW1, SW2, SW3, and SW4 may be connected to one end of the bottom portion FP. The second sidewall portion SWP2 disposed at the rightmost position among the sidewalls SWP1, SWP2, SW1, SW2, SW3, and SW4 may be connected to the other end of the bottom portion FP.

Among the third sidewall portions, the first, second, third, and fourth sidewalls SW1, SW2, SW3, and SW4 may be sequentially arranged between the first sidewall portion SWP1 and the second sidewall portion SWP2.

The first sidewall SW1 may be disposed between the first sidewall portion SWP1 and the second sidewall SW2. The fourth sidewall SW4 may be disposed between the second sidewall portion SWP2 and the third sidewall SW3.

The load carrier CSP may include protrusions PP1 and PP2 disposed on the sidewalls SWP1, SWP2, SW1, SW2, SW3, and SW4. For example, the load carrier CSP may include the protrusions PP1 and PP2 disposed on a first surface S1 of an (h+1)th sidewall and a second surface S2 of an h-th sidewall, which faces the first surface S1 of the (h+1)th sidewall.

Two surfaces facing each other of two sidewalls may be defined as the first surface S1 and the second surface S2, respectively. Each of the first to fourth sidewalls SW1 to SW4 may include the first surface S1 and the second surface S2, which are defined as opposite surfaces to each other in the third direction DR3. For example, a left surface of each of the first to fourth sidewalls SW1 to SW4 in the first direction DR1 may be defined as the first surface S1, and a right surface of each of the first to fourth sidewalls SW1 to SW4 may be defined as the second surface S2. The first surface S1 and the second surface S2 may be a plane defined by the first direction DR1 and the second direction DR2. A surface of the first sidewall portion SWP1 facing the first sidewall SW1 may be defined as the second surface S2, and a surface of the second sidewall portion SWP2 facing the fourth sidewall SW4 may be defined as the first surface S1.

For instance, when viewed in the first direction DR1, the first sidewall SW1 may include the first surface S1 that is defined as the left surface of the first sidewall SW1 and the second surface S2 that is defined as the right surface of the first sidewall SW1. The first sidewall SW1 may include the first surface S1 and the second surface S2, which are opposite to each other in the third direction DR3.

The protrusions PP1 and PP2 may include first protrusions PP1 disposed on the first surfaces S1 and second protrusions PP2 disposed on the second surfaces S2.

For instance, in the first sidewall SW1, the first protrusions PP1 may be disposed on the first surface S1 of the first sidewall SW1, and the second protrusions PP2 may be disposed on the second surface S2 of the first sidewall SW1.

The first protrusions PP1 may include first sub-protrusions PP1_1, second sub-protrusions PP1_2, and third sub-protrusions PP1_3.

The second protrusions PP2 may include fourth sub-protrusions PP2_1, fifth sub-protrusions PP2_2, and sixth sub-protrusions PP2_3.

The first sub-protrusions PP1_1 may be disposed on the first surfaces S1 of the sidewalls SWP2, SW1, SW2, SW3, and SW4 and may be disposed in the first protruding area PA1. The second sub-protrusions PP1_2 may be disposed on the first surfaces S1 of the sidewalls SWP2, SW1, SW2, SW3, and SW4 and may be disposed in the second protruding area PA2. The third sub-protrusions PP1_3 may be disposed on the first surfaces S1 of the sidewalls SWP2, SW1, SW2, SW3, and SW4 and may be disposed in the third protruding area PA3.

The fourth sub-protrusions PP2_1 may be disposed on the second surfaces S2 of the sidewalls SWP1, SW1, SW2, SW3, and SW4 and may be disposed in the first protruding area PA1. The fifth sub-protrusions PP2_2 may be disposed on the second surfaces S2 of the sidewalls SWP1, SW1, SW2, SW3, and SW4 and may be disposed in the second protruding area PA2. The sixth sub-protrusions PP2_3 may be disposed on the second surfaces S2 of the sidewalls SWP1, SW1, SW2, SW3, and SW4 and may be disposed in the third protruding area PA3.

The second protrusions PP2 disposed on the second surface S2 of the first sidewall SW1 and the first protrusions PP1 disposed on the first surface S1 of the second sidewall SW2 may be protruded to face each other, respectively. The fourth sub-protrusions PP2_1 disposed on the second surface S2 of the first sidewall SW1 and the first sub-protrusions PP1_1 disposed on the first surface S1 of the second sidewall SW2 may be protruded to face each other, respectively.

The fifth sub-protrusions PP2_2 disposed on the second surface S2 of the first sidewall SW1 and the second sub-protrusions PP1_2 disposed on the first surface S1 of the second sidewall SW2 may be protruded to face each other, respectively. The sixth sub-protrusions PP2_3 disposed on the second surface S2 of the first sidewall SW1 and the third sub-protrusions PP1_3 disposed on the first surface S1 of the second sidewall SW2 may be protruded to face each other, respectively.

The first protrusions PP1 and the second protrusions PP2 may have substantially the same area when viewed in the third direction DR3. The first to third sub-protrusions PP1_1 to PP1_3 may have substantially the same area as the fourth to sixth sub-protrusions PP2_1 to PP2_3. However, the area of the protrusions PP1 and PP2 should not be limited thereto. For example, the first protrusions PP1 and the second protrusions PP2 may have different areas from each other when viewed in the third direction DR3. The first to third sub-protrusions PP1_1 to PP1_3 may have the areas different from those of the fourth to sixth sub-protrusions PP2_1 to PP2_3.

The first, second, and third sub-protrusions PP1_1, PP1_2, and PP1_3 may have a hexahedron shape having long sides in the second direction DR2 and short sides in the first direction DR1 and protruded toward to the first sidewall portion SWP1, however, they should not be limited thereto. The first, second, and third sub-protrusions PP1_1, PP1_2, and PP1_3 may have a variety of shapes.

The first, second, and third sub-protrusions PP1_1, PP1_2, and PP1_3 may be disposed on the first surface S1 of the first sidewall SW1 and may be spaced apart from each other at regular intervals in the second direction DR2. The first sub-protrusions PP1_1 may overlap the first protruding area PA1. The second sub-protrusions PP1_2 may overlap the second protruding area PA2. The third sub-protrusions PP1_3 may overlap the third protruding area PA3.

The second surface S2 of the first sidewall SW1 may include the second protrusions PP2. The second protrusions PP2 may include the fourth sub-protrusions PP2_1, the fifth sub-protrusions PP2_2, and the sixth sub-protrusions PP2_3.

The fourth, fifth, and sixth sub-protrusions PP2_1, PP2_2, and PP2_3 may have a hexahedron shape having long sides in the second direction DR2 and short sides in the first direction DR1 and protruded toward the second sidewall portion SWP2, however, they should not be limited thereto. The fourth, fifth, and sixth sub-protrusions PP2_1, PP2_2, and PP2_3 may have a variety of shapes.

The fourth, fifth, and sixth sub-protrusions PP2_1, PP2_2, and PP2_3 may be disposed on the second surface S2 of the first sidewall SW1 and may be spaced apart from each other at regular intervals in the second direction DR2. The fourth sub-protrusions PP2_1 may overlap the first protruding area PA1. The fifth sub-protrusions PP2_2 may overlap the second protruding area PA2. The sixth sub-protrusions PP2_3 may overlap the third protruding area PA3.

The window substrates UTG may be disposed between the sidewalls SWP1, SW1, SW2, SW3, SW4, and SWP2 respectively. The window substrates UTG may be disposed on the bottom portion FP. The window substrates UTG may be in contact with the first protrusions PP1 and the second protrusions PP2. The window substrates UTG may be indirectly in contact with the sidewalls SWP1, SWP2, SW1, SW2, SW3, and SW4, which support the window substrates UTG, by the first protrusions PP1 and the second protrusions PP2.

When the protrusions PP1 and PP2 are not disposed on the sidewalls SWP1, SWP2, SW1, SW2, SW3, and SW4, the window substrates UTG may be in contact with the first surfaces S1 and the second surfaces S2 of the sidewalls SWP1, SW1, SW2, SW3, SW4, and SWP2. The contact area of the window substrates UTG may increase. However, according to an embodiment of the disclosure, the window substrates UTG contact the protrusions PP1 and PP2 (which have a smaller area than the sidewalls SWP1 SW1, SW2, SW3, SW4, and SWP2) instead of directly contacting the sidewalls SWP1, SW1, SW2, SW3, SW4, and SWP2, and the contact area of the window substrates UTG may decrease.

Figure 6:
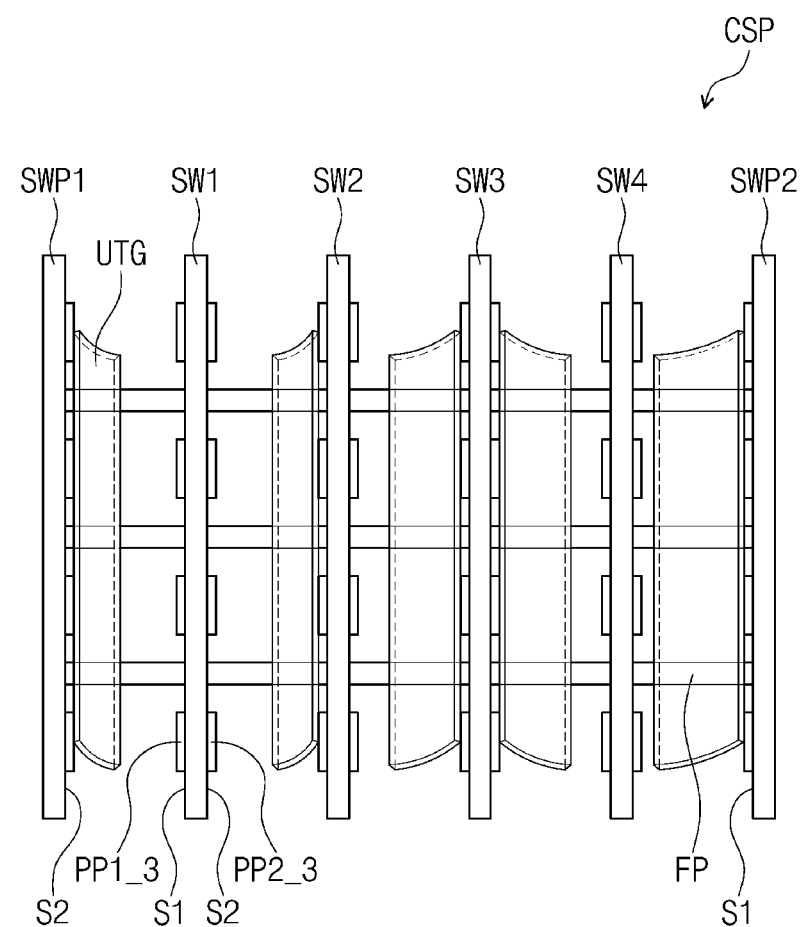
FIG. 6 is a schematic view showing the load carrier shown in FIG. 5 when viewed in a second direction.
Figure 6:
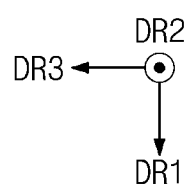

FIG. 6 is a schematic view showing the load carrier CSP shown in FIG. 5 when viewed in the second direction DR2.

Referring to FIG. 6, the load carrier CSP may include the bottom portions FP extending in the third direction DR3 and arranged in the first direction DR1. In this example, three bottom portions FP are shown, however, the number of the bottom portions FP should not be limited to three. The bottom portions FP may support the sidewalls. The bottom portions FP may support the window substrates UTG.

The third sub-protrusions PP1_3 may be disposed on the first surface S1 of the first sidewall SW1 and may be spaced apart from each other at regular intervals in the first direction DR1. In this example, four third sub-protrusions PP1_3 are shown, however, the embodiments are not limited to four third sub-protrusions PP1_3.

The sixth sub-protrusions PP2_3 may be disposed on the second surface S2 of the first sidewall SW1 and may be spaced apart from each other at regular intervals in the first direction DR1. In this example, four sixth sub-protrusions PP2_3 are shown, however, the embodiments are not limited to four sixth sub-protrusions PP2_3.

Figure 7:
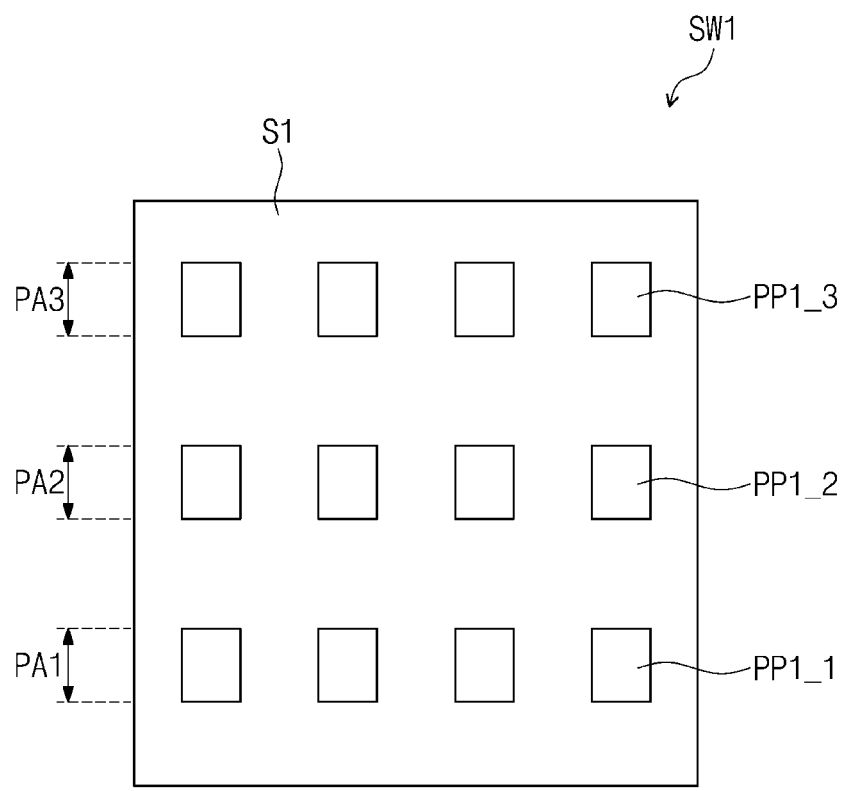
FIG. 7 is a schematic view showing a first surface of a first sidewall shown in FIG. 5 when viewed in a first direction.

FIG. 7 is a schematic view showing the first surface S1 of the first sidewall SW1 shown in FIG. 5 when viewed in the third direction DR3.

Referring to FIG. 7, the first protrusions PP1 of the first sidewall SW1 may be arranged in a matrix form when viewed in the third direction DR3. The first sub-protrusions PP1_1, the second sub-protrusions PP1_2, and the third sub-protrusions PP1_3 may be arranged in the second direction DR2 and may be spaced apart from each other at regular intervals.

The first sub-protrusions PP1_1 may overlap the first protruding area PA1 and may be arranged to be spaced apart from each other at regular intervals in the first direction DR1. The second sub-protrusions PP1_2 may overlap the second protruding area PA2 and may be arranged to be spaced apart from each other in the first direction DR1. The third sub-protrusions PP1_3 may overlap the third protruding area PA3 and may be arranged to be spaced apart from each other in the first direction DR1.

Figure 8A:
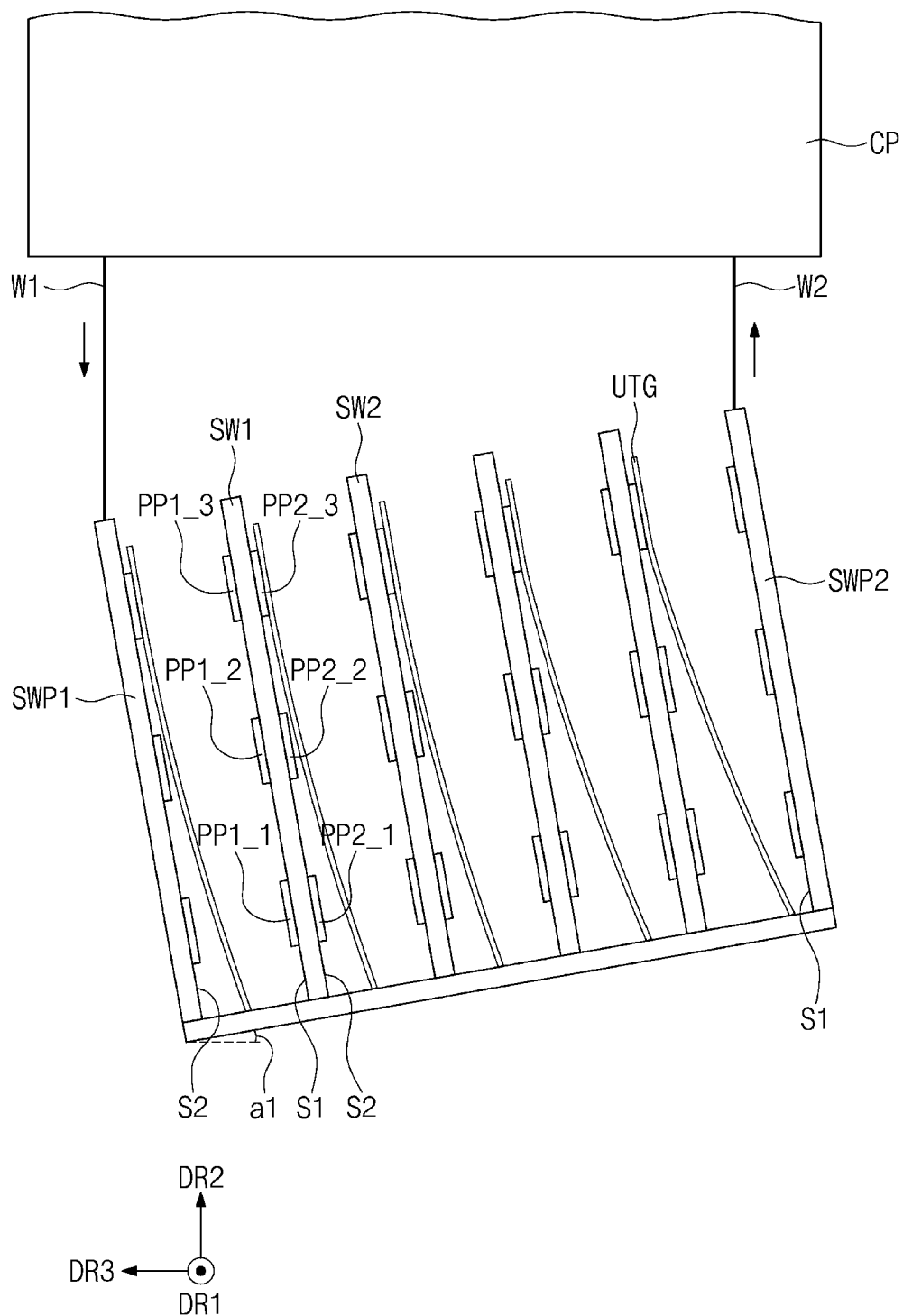
FIG. 8A is a schematic view showing a controller and a load carrier in a first operation state.
Figure 8B:
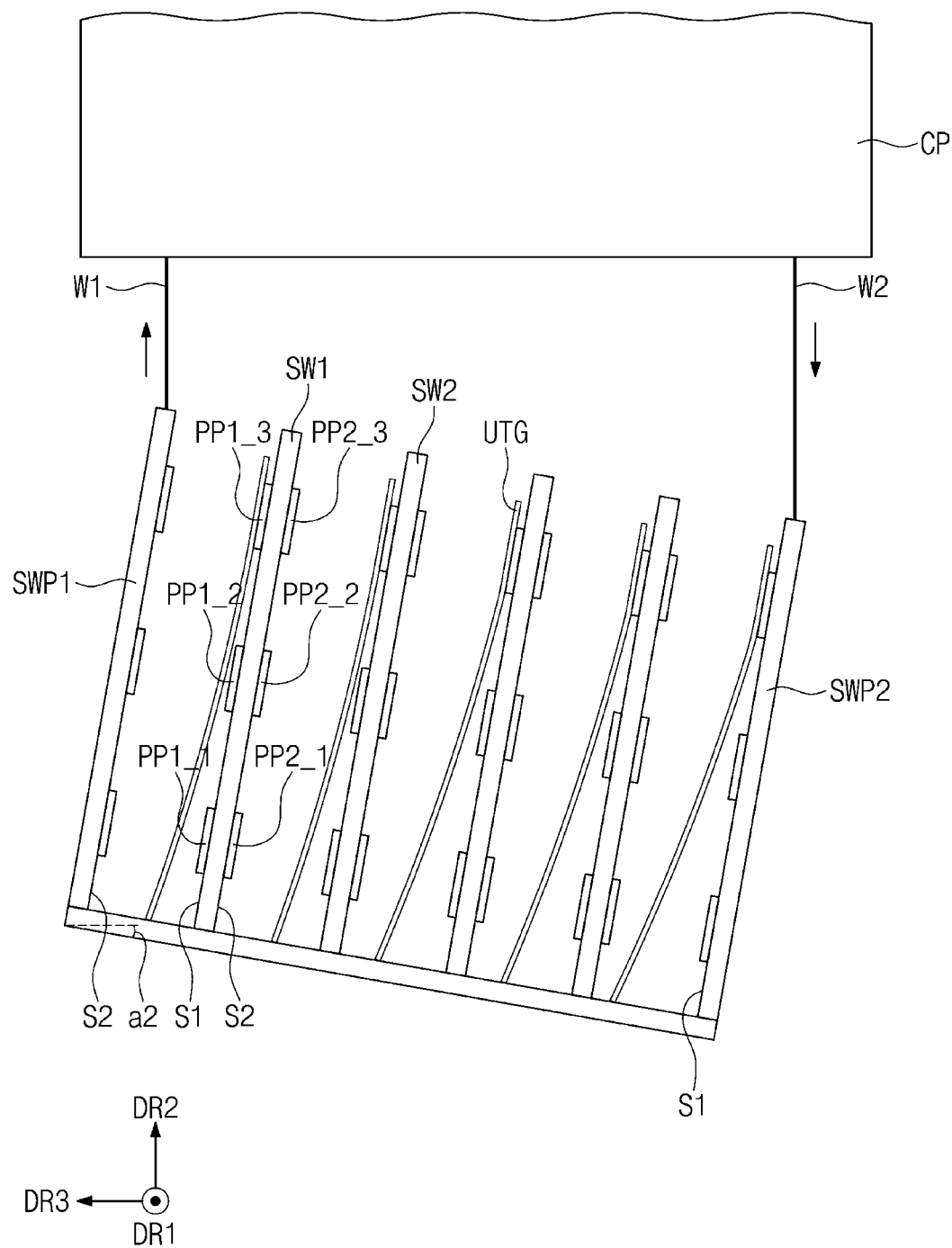
FIG. 8B is a schematic view showing the controller and the load carrier in a second operation state.

FIG. 8A is a schematic view showing a controller CP and the load carrier CSP in a first operation state, and FIG. 8B is a view showing the controller CP and the load carrier CSP in a second operation state.

Referring to FIGS. 8A and 8B, a first wire W1 may be connected to the first sidewall portion SWP1 of the load carrier CSP, and a second wire W2 may be connected to the second sidewall portion SWP2 of the load carrier CSP. The first wire W1 and the second wire W2 may be connected to the controller CP. The load carrier CSP may be connected to the controller CP by the first wire W1 and the second wire W2.

The controller CP may control the first wire W1 and the second wire W2 in the second direction DR2.

In the first operation, the first wire W1 may move in a downward direction by the controller CP, and the second wire W2 may move in an upward direction by the controller CP.

The first sidewall portion SWP1 may be moved in a downward direction by the first wire W1, and the second sidewall portion SWP2 may be moved in an upward direction by the second wire W2. The upper end of the first sidewall portion SWP1 may be positioned lower than the upper end of the second sidewall portion SWP2. The load carrier CSP may be tilted. In the first operation, the load carrier CSP may be tilted at a first angle a1 corresponding to an angle between the third direction DR3 and the bottom portion FP.

In the second operation, the first sidewall portion SWP1 may be moved in an upward direction by the first wire W1, and the second sidewall portion SWP2 may be moved in a downward direction by the second wire W2. The upper end of the first sidewall portion SWP1 may be positioned higher than the upper end of the second sidewall portion SWP2. The load carrier CSP may be tilted. In the second operation, the load carrier CSP may be tiled at a second angle a2 corresponding to an angle between the third direction DR3 and the bottom portion FP.

In the first operation, the window substrates UTG may indirectly contact the second surfaces S2 of the sidewalls. The window substrates UTG may contact with the second protrusions PP2 of the second surfaces S2. The window substrates UTG may contact all of the fourth, fifth, and sixth sub-protrusions PP2_1, PP2_2, and PP2_3 or a portion of the fourth, fifth, and sixth sub-protrusions PP2_1, PP2_2, and PP2_3.

In the second operation, the window substrates UTG may indirectly contact the first surfaces S1 of the sidewalls. The window substrates UTG may contact the first protrusions PP1 of the first surfaces S1. The window substrates UTG may contact all of the first, second, and third sub-protrusions PP1_1, PP1_2, and PP1_3 or a portion of the first, second, and third sub-protrusions PP1_1, PP1_2, and PP1_3.

The controller CP may control the first operation and the second operation. In case that the window substrates UTG have contacted the second protrusions PP2 for about 1 second to about 5 seconds in the first operation, the controller CP may change the operation of the load carrier CSP to the second operation.

In case that the window substrates UTG have contacted the first protrusions PP1 for about 1 second to about 5 seconds in the second operation, the controller CP may change the operation of the load carrier CSP to the first operation.

In case that the first operation and the second operation are repeated by the controller CP, the time during which the window substrates UTG may contact the first protrusions PP1 and the second protrusions PP2 may decrease. Accordingly, deformation of portions of the window substrates UTG, which contact the first protrusions PP1 and the second protrusions PP2 may be prevented.

Figure 9:
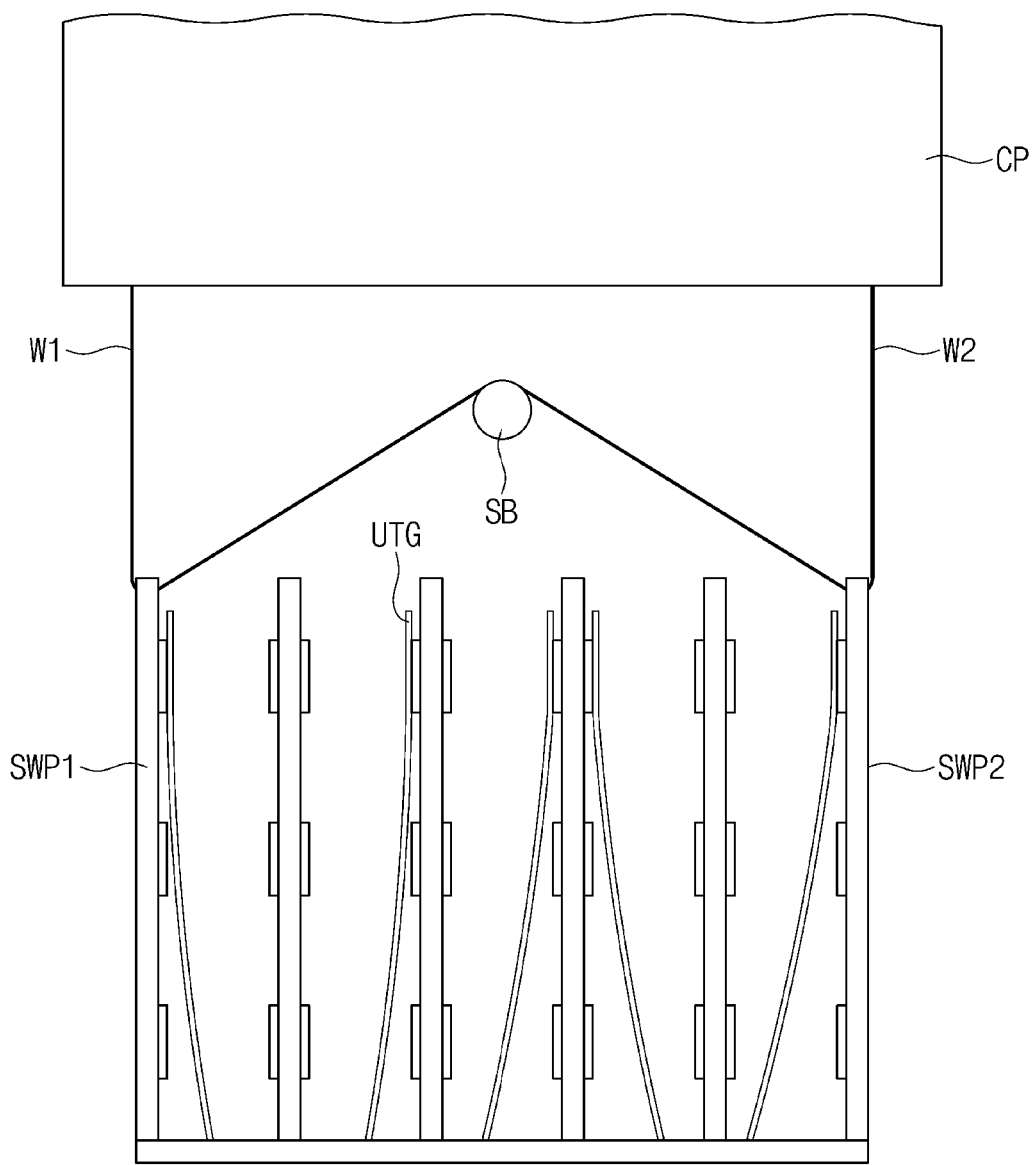
FIG. 9 is a schematic view showing a supporter disposed between the controller and the load carrier shown in FIGS. 8A and 8B.

FIG. 9 is a schematic view showing a supporter SB disposed between the controller CP and the load carrier CSP shown in FIGS. 8A and 8B.

Referring to FIG. 9, the supporter SB extending in the first direction DR1 and having a cylinder shape may be disposed between the controller CP and the load carrier CSP. However, the shape of the supporter SB should not be limited to the cylinder shape. For example, the supporter SB may have a pulley shape.

The first wire W1 and the second wire W2 may be connected to each other by the supporter SB.

In the first operation, the first wire W1 may move in the downward direction, and the second wire W2 may move in the upward direction. The supporter SB may rotate in a counterclockwise direction and may support the first wire W1 and the second wire W2.

In the second operation, the first wire W1 may move in the upward direction, and the second wire W2 may move in the downward direction. The supporter SB may rotate in a clockwise direction and may support the first wire W1 and the second wire W2.

Since the supporter SB is connected to the first wire W1 and the second wire W2, which are connected to the controller CP, the first wire W1 and the second wire W2 may move more stably. Accordingly, the load carrier CSP connected to the first wire W1 and the second wire W2 may be tilted more stably.

As the load carrier CSP is stably tilted, the impact applied to the window substrates UTG may be reduced, and thus, damage to the window substrates UTG may be prevented.

Figure 10:
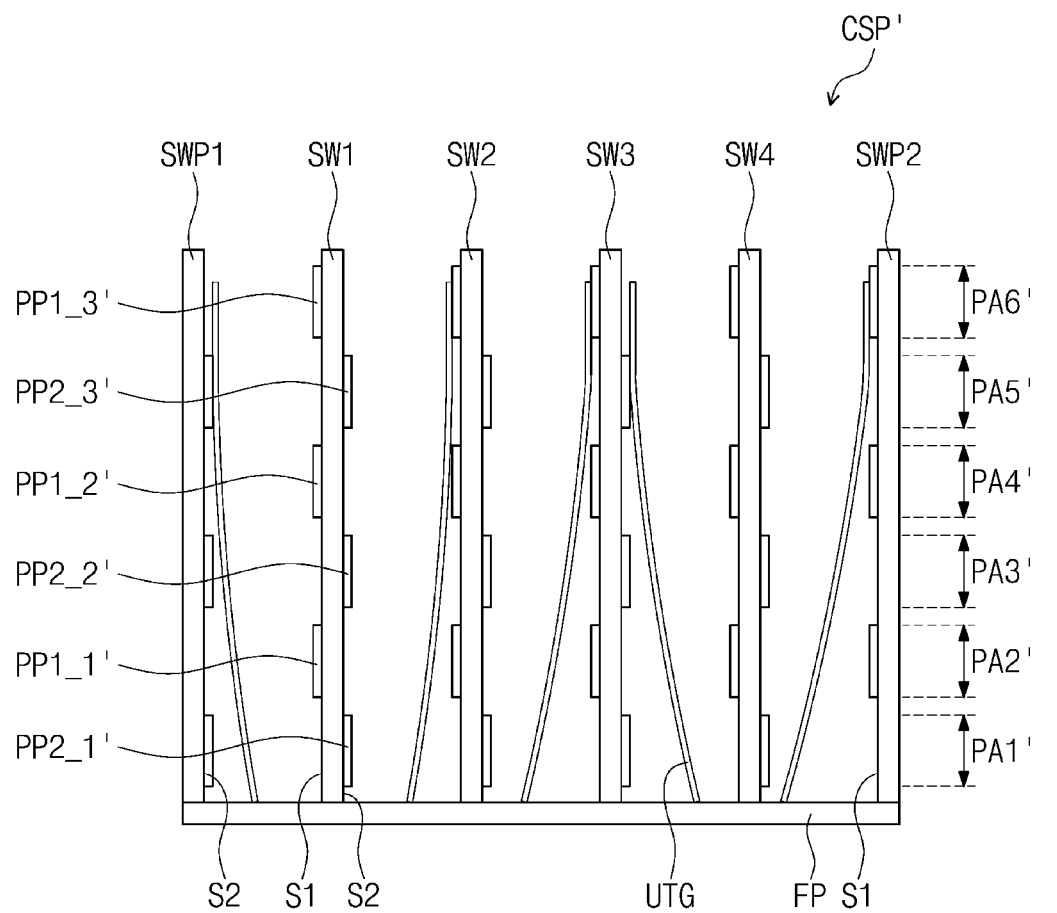
FIGS. 10, 11A, and 11B are schematic views showing load carriers according to other embodiments of the disclosure.
Figure 11A:
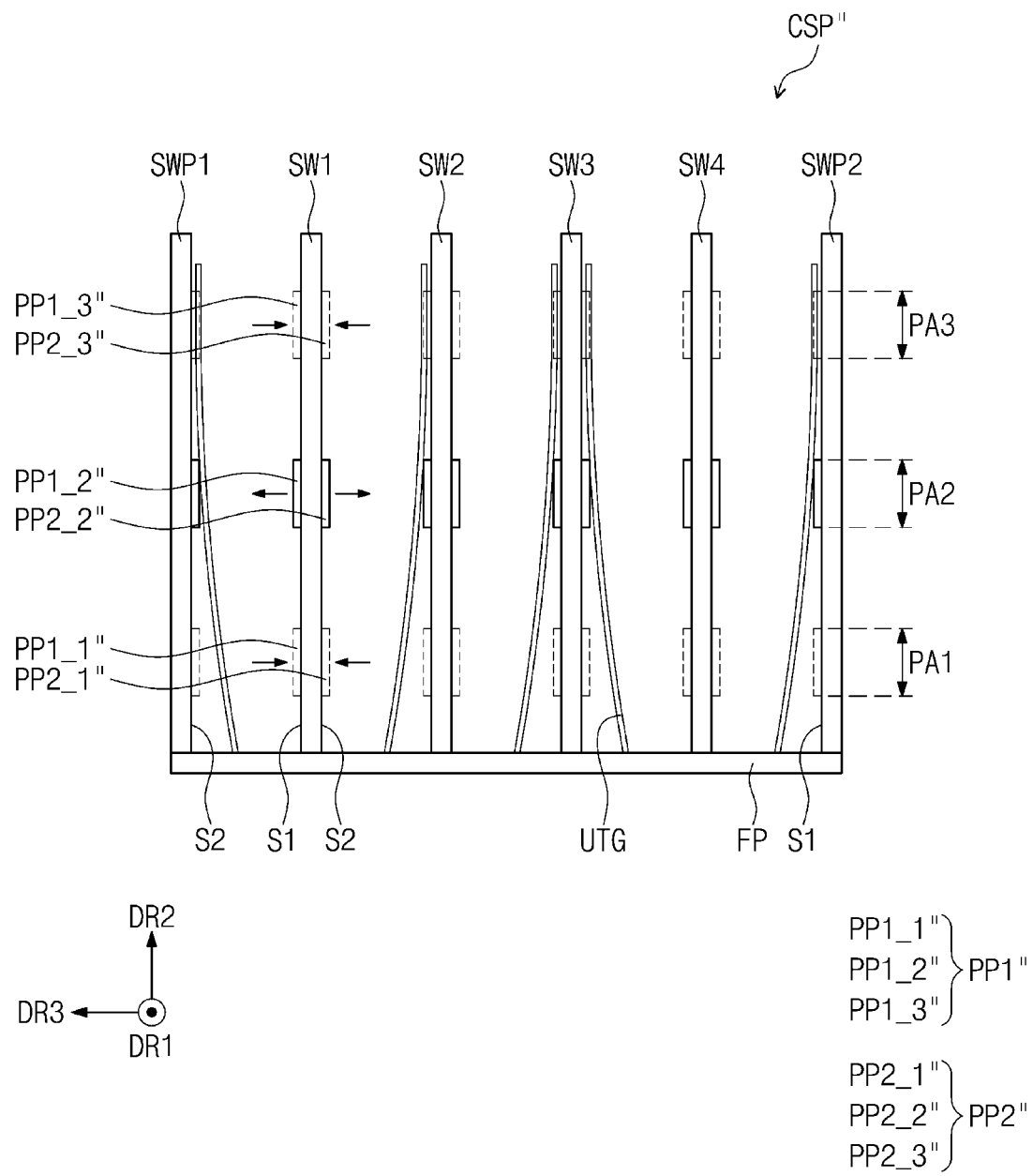
Figure 11B:
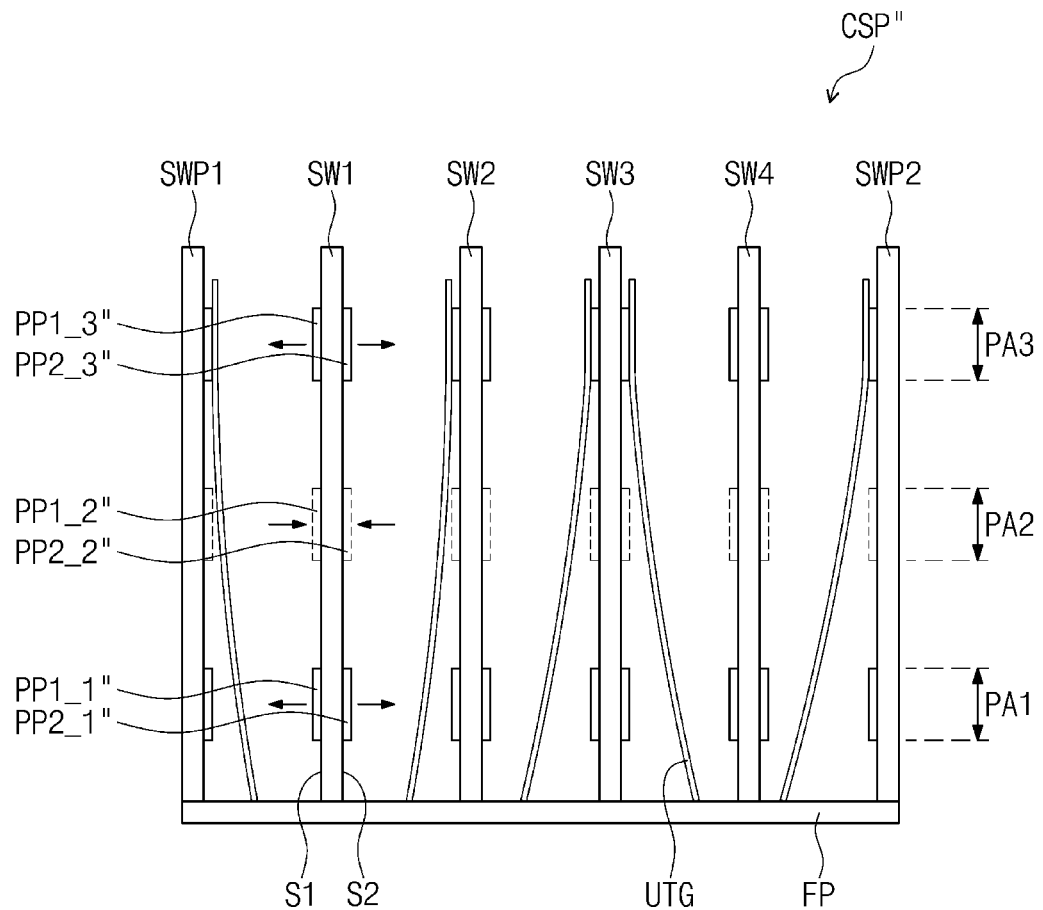

FIGS. 10, 11A, and 11B are schematic views showing load carriers CSP' and CSP'' according to other embodiments of the disclosure.

Hereinafter, the load carriers CSP' and CSP'' will be described in detail with reference to FIGS. 10, 11A, and 11B. In FIGS. 10, 11A, and 11B, the same reference numerals denote the same elements in FIG. 5. Thus, detailed descriptions of the same elements will be omitted, and different features will be described.

Referring to FIG. 10, the load carrier CSP' may include a bottom portion FP, a first sidewall portion SWP1, a second sidewall portion SWP2, sidewalls SW1, SW2, SW3, and SW4, protruding areas PA1', PA2', PA3', PA4', PA5', and PA6', first protrusions PP1', and second protrusions PP2'.

The protruding areas PA1', PA2', PA3', PA4', PA5', and PA6' may include a first protruding area PA1', a second protruding area PA2', a third protruding area PA3', a fourth protruding area PA4', a fifth protruding area PA5', and a sixth protruding area PA6'. The first protruding area PA1', the second protruding area PA2', the third protruding area PA3', the fourth protruding area PA4', the fifth protruding area PA5', and the sixth protruding area PA6' may be arranged in the second direction DR2 and may be spaced apart from each other at regular intervals. In this example, six protruding areas PA1', PA2', PA3', PA4', PA5', and PA6' are shown, however, the embodiments are not limited by the number of protruding areas.

The first protrusions PP1' may be disposed on a first surface S1 of a first sidewall SW1. The first protrusions PP1' may include first sub-protrusions PP1_1', second sub-protrusions PP1_2', and third sub-protrusions PP1_3'.

The second protrusions PP2' may be disposed on a second surface S2 of the first sidewall SW1. The second protrusions PP2' may include fourth sub-protrusions PP2_1', fifth sub-protrusions PP2_2', and sixth sub-protrusions PP2_3'.

The first, second, and third sub-protrusions PP1_1', PP1_2', and PP1_3' may respectively overlap the second protruding area PA2', the fourth protruding area PA4', and the sixth protruding area PA6'.

The fourth, fifth, and sixth sub-protrusions PP2_1', PP2_2', and PP2_3' may respectively overlap the first protruding area PA1', the third protruding area PA3', and the fifth protruding area PA5'.

The first, second, and third sub-protrusions PP1_1', PP1_2', and PP1_3' may be alternately arranged with the fourth, fifth, and sixth sub-protrusions PP2_1', PP2_2', and PP2_3'.

In the first operation, window substrates UTG may indirectly contact second surfaces S2 of the first sidewall portion SWP1 and the sidewalls. The window substrates UTG may contact the second protrusions PP2' of the second surfaces S2. The window substrates UTG may contact all the fourth, fifth, and sixth sub-protrusions PP2_1', PP2_2', and PP2_3' or a portion of the fourth, fifth, and sixth sub-protrusions PP2_1', PP2_2', and PP2_3'.

In the second operation, the window substrates UTG may indirectly contact the first surfaces S1 of the second sidewall portion SWP2 and the sidewalls. The window substrates UTG may contact the first protrusions PP1' of the first surfaces S1. The window substrates UTG may contact all the first, second, and third sub-protrusions PP1_1', PP1_2', and PP1_3' or a portion of the first, second, and third sub-protrusions PP1_1', PP1_2', and PP1_3'.

In case that the first operation and the second operation are repeated, the time the window substrates UTG may contact the first protrusions PP1' and the second protrusions PP2' may decrease. Since the window substrates UTG may contact portions of the first protrusions PP1' and the second protrusions PP2', which may be arranged in a staggered manner, deformation of the window substrates UTG in the contact portions with the first protrusions PP1' and the second protrusions PP2' may be prevented.

Referring to FIGS. 11A and 11B, the load carrier CSP" may include a bottom portion FP, a first sidewall portion SWP1, a second sidewall portion SWP2, sidewalls SW1, SW2, SW3, and SW4, protruding areas PA1, PA2, and PA3, first protrusions PP1", and second protrusions PP2".

The first protrusions PP1" may be disposed on a first surface S1 of a first sidewall SW1. The first protrusions PP1" may include first sub-protrusions PP1_1", second sub-protrusions PP1_2", and third sub-protrusions PP1_3".

The second protrusions PP2" may be disposed on a second surface S2 of the first sidewall SW1. The second protrusions PP2" may include fourth sub-protrusions PP2_1", fifth sub-protrusions PP2_2", and sixth sub-protrusions PP2_3".

In this example, three protrusions are disposed on every sidewall, however, the embodiments are not limited by number of protrusions.

The first sub-protrusions PP1_1" and the fourth sub-protrusions PP2_1" may overlap a first protruding area PA1. The second sub-protrusions PP1_2" and the fifth sub-protrusions PP2_2" may overlap a second protruding area PA2. The third sub-protrusions PP1_3" and the sixth sub-protrusions PP2_3" may overlap a third protruding area PA3.

The load carrier CSP" may be operated in a first mode shown in FIG. 11A and a second mode shown in FIG. 11B.

In the first mode, the first sub-protrusions PP1_1" and the third sub-protrusions PP1_3" of the first sidewall SW1 may be retracted into the first surface S1 of the first sidewall SW1. The fourth sub-protrusions PP2_1" and the sixth sub-protrusions PP2_3" of the first sidewall SW1 may be retracted into the second surface S2 of the first sidewall SW1. The second sub-protrusions PP1_2" of the first sidewall SW1 may protrude from the first surface S1 of the first sidewall SW1 toward the first sidewall portion SWP1. The fifth sub-protrusions PP2_2" of the first sidewall SW1 may protrude from the second surface S2 of the first sidewall SW1 toward the second sidewall portion SWP2.

In the second mode, the first sub-protrusions PP1_1" and the third sub-protrusions PP1_3" of the first sidewall SW1 may protrude from the first surface S2 of the first sidewall SW1 toward the first sidewall portion SWP1. The fourth sub-protrusions PP2_1" and the sixth sub-protrusions PP2_3" of the first sidewall SW1 may protrude from the second surface S2 of the first sidewall SW1 toward the second sidewall portion SWP2. The second sub-protrusions PP1_2" of the first sidewall SW1 may be retracted into the first surface S1 of the first sidewall SW1. The fifth sub-protrusions PP2_2" of the first sidewall SW1 may be retracted into the second surface S2 of the first sidewall SW1.

In the first mode, window substrates UTG may contact a portion of the second and fifth sub-protrusions PP1_2" and PP2_2". In case that the window substrates UTG may have contacted a portion of the second and fifth sub-protrusions PP1_2" and PP2_2" for about 1 second to about 5 seconds, the first mode may be changed to the second mode.

In the second mode, the window substrates UTG may contact a portion of the first, third, fourth, and sixth sub-protrusions PP1_1", PP1_3", PP2_1", and PP2_3". In case that the window substrates UTG have contacted the portion of the first, third, fourth, and sixth sub-protrusions PP1_1", PP1_3", PP2_1", and PP2_3" for about 1 second to about 5 seconds, the second mode may be changed to the first mode again.

In case that the first mode and the second mode are repeated, the time during which the window substrates UTG may contact the first protrusions PP1" and the second protrusions PP2" may decrease. Accordingly, deformation of the portions of the window substrates UTG, which are in contact with the first protrusions PP1" and the second protrusions PP2", may be prevented.

Figure 12:
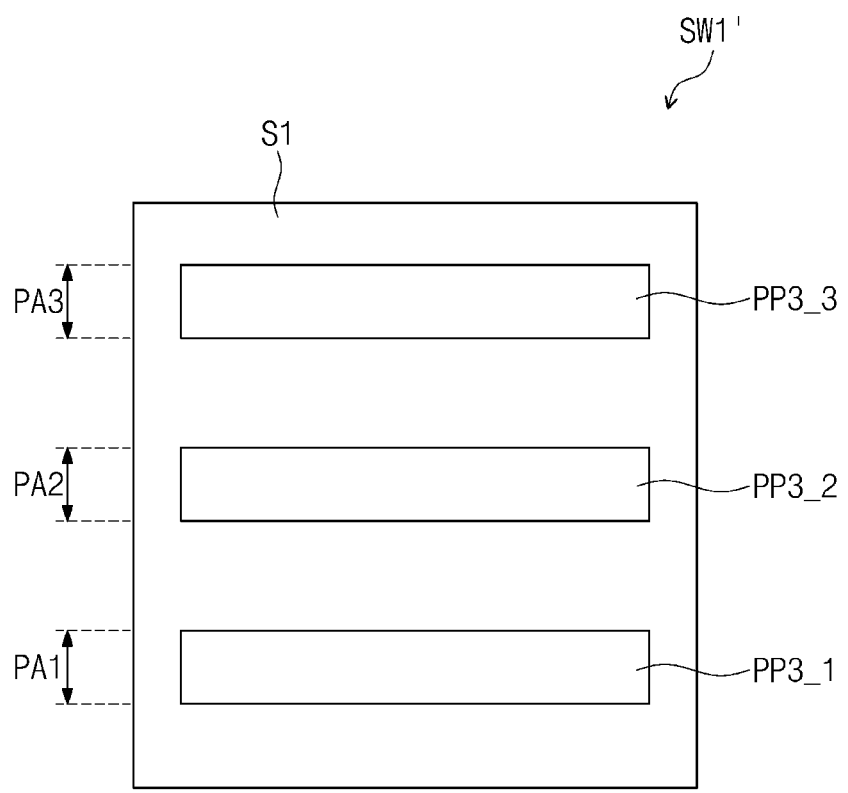
FIG. 12 is a schematic view showing a first sidewall according to another embodiment of the disclosure.
Figure 12:
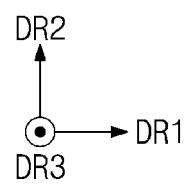

FIG. 12 is a schematic view showing a first sidewall SW1' according to another embodiment of the disclosure.

Hereinafter, the first sidewall SW1' will be described in detail with reference to FIG. 12. In FIG. 12, the same reference numerals denote the same elements in FIG. 7. Thus, detailed descriptions of the same elements will be omitted, and different features will be described.

Referring to FIG. 12, a first protruding bar PP3_1, a second protruding bar PP3_2, and a third protruding bar PP3_3 may be disposed on a first surface S1 of the first sidewall SW1'.

The first protruding bar PP3_1, the second protruding bar PP3_2, and the third protruding bar PP3_3 may extend in the first direction DR1 and may be arranged in the second direction DR2 to be spaced apart from each other at regular intervals. The first protruding bar PP3_1 may overlap a first protruding area PA1. The second protruding bar PP3_2 may overlap a second protruding area PA2. The third protruding bar PP3_3 may overlap a third protruding area PA3.

The first protruding bar PP3_1 may have a shape obtained by connecting the first sub-protrusions PP1_1 shown in FIG. 7 to each other. The second protruding bar PP3_2 may have a shape obtained by connecting the second sub-protrusions PP1_2 shown in FIG. 7 to each other. The third protruding bar PP3_3 may have a shape obtained by connecting the third sub-protrusions PP1_3 shown in FIG. 7 to each other.

However, the first protruding bar PP3_1, the second protruding bar PP3_2, and the third protruding bar PP3_3 should not be limited thereto. For example, the first protruding bar PP3_1, the second protruding bar PP3_2, and the third protruding bar PP3_3 may extend in the second direction DR2 and may be arranged in the first direction DR1 to be spaced apart from each other at regular intervals.

Although the embodiments of the disclosure have been described, it is understood that the disclosure should not be limited to these embodiments but various changes and modifications can be made by one of ordinary skilled in the art within the spirit and scope of the disclosure as hereinafter claimed. Therefore, the disclosed subject matter should not be limited to any single embodiment described herein, and the scope of the embodiments shall be determined according to the attached claims.

What is claimed is:

1. A method of using a window manufacturing system comprising: a first wire; a second wire spaced apart from the first wire; a controller that moves the first wire and the second wire up and down; and a load carrier connected to the first wire and the second wire, wherein window substrates are disposed in the load carrier, and the controller moves the first wire and the second wire in opposite directions to each other.

2. The method of using the window manufacturing system of claim 1, wherein
the load carrier comprises:
sidewalls; and
a bottom portion connected to a lower end of the sidewalls, and
the window substrates are disposed between the sidewalls.

3. The method of using the window manufacturing system of claim 2, wherein
the sidewalls comprise:
a first sidewall portion connected to an end of the bottom portion; and
a second sidewall portion connected to another end of the bottom portion,
the first wire is connected to the first sidewall portion, and
the second wire is connected to the second sidewall portion.

4. The method of using the window manufacturing system of claim 3, wherein
an upper end of the first sidewall portion is lower than an upper end of the second sidewall portion when the controller moves the first wire in a downward direction and moves the second wire in an upward direction, and
the upper end of the first sidewall portion is higher than the upper end of the second sidewall portion when the controller moves the first wire in the upward direction and moves the second wire in the downward direction.

5. The method of using the window manufacturing system of claim 4, wherein
the upper end of the first sidewall portion is lower than the upper end of the second sidewall portion in a first operation,
the upper end of the first sidewall portion is higher than the upper end of the second sidewall portion in a second operation, and
the controller repeats the first operation and the second operation every about one second to about five seconds.

6. The method of using the window manufacturing system of claim 2, wherein
each of the sidewalls includes a first surface and a second surface, the first surface of a first corresponding sidewall from the sidewalls facing the second surface of a second corresponding sidewall from the sidewalls, and
the load carrier comprises protrusions disposed on the first surface and the second surface of the sidewalls.

7. The method of using the window manufacturing system of claim 6, wherein the protrusions comprise:
first protrusions disposed on the first surface of a first corresponding sidewall from the sidewalls; and
second protrusions disposed on the second surface of a second corresponding sidewall from the sidewalls.

8. The method of using the window manufacturing system of claim 7, wherein the first protrusions face the second protrusions, respectively.

9. The method of using the window manufacturing system of claim 7, wherein an area size of each of the first protrusions is substantially equal to an area size of each of the second protrusions in a plan view.

10. The method of using the window manufacturing system of claim 7, wherein the first protrusions have a different area from an area of the second protrusions.

11. The method of using the window manufacturing system of claim 7, wherein the first protrusions and the second protrusions are arranged in a matrix form.

12. The method of using the window manufacturing system of claim 7, wherein the first protrusions are alternately arranged with the second protrusions.

13. The method of using the window manufacturing system of claim 7, wherein the first protrusions extend in one direction.

14. The method of using the window manufacturing system of claim 7, wherein the first protrusions comprise first sub-protrusions and second sub-protrusions that retract into the sidewalls or protrude out from the sidewalls.

15. The method of using the window manufacturing system of claim 14, wherein
the second sub-protrusions protrude out from the sidewalls when the first sub-protrusions retract into the sidewalls, and
the second sub-protrusions retract into the sidewalls when the first sub-protrusions protrude out from the sidewalls.

* * * * *